(12) United States Patent
Lalla

(10) Patent No.: US 6,427,129 B1
(45) Date of Patent: Jul. 30, 2002

(54) MEASURING ASSEMBLY

(75) Inventor: Robert Lalla, Lörrach (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/111,967

(22) Filed: Jul. 8, 1998

(30) Foreign Application Priority Data

Jul. 14, 1997 (DE) .......................................... 197 30 158

(51) Int. Cl.$^7$ .............................................. G01B 21/08
(52) U.S. Cl. ........................................ 702/88; 702/99
(58) Field of Search ............................ 702/85–88, 90, 702/91, 99, 100, 104, 107, 189

(56) References Cited

U.S. PATENT DOCUMENTS

| | | | |
|---|---|---|---|
| 4,593,365 A | 6/1986 | Haley, Jr. et al. | |
| 4,818,994 A | 4/1989 | Orth et al. | |
| 4,845,649 A | 7/1989 | Eckhardt et al. | |
| 5,008,843 A | 4/1991 | Polesler et al. | |
| 5,089,979 A | * 2/1992 | McEachern et al. | 702/91 |
| 5,377,128 A | * 12/1994 | McBean | 702/91 |
| 5,706,215 A | * 1/1998 | Woolley et al. | 702/57 |
| 6,023,969 A | * 2/2000 | Feller | 73/204.25 |
| 6,032,109 A | * 2/2000 | Ritmiller, III | 702/104 |

FOREIGN PATENT DOCUMENTS

| | | |
|---|---|---|
| DE | 31 42 468 | 6/1982 |
| DE | 34 46 248 | 6/1986 |
| DE | 35 22 815 | 1/1987 |
| DE | 90 06 273 | 11/1991 |
| DE | 43 11 614 | 10/1993 |
| EP | 0 324 067 A | 7/1989 |
| EP | 0 458 995 | 12/1991 |
| GB | 2 065 890 A | 7/1981 |
| GB | 2 119 095 | 11/1983 |

* cited by examiner

Primary Examiner—Marc S. Hoff
Assistant Examiner—Craig S. Miller
(74) Attorney, Agent, or Firm—Bose McKinney & Evans LLP

(57) ABSTRACT

The measuring assembly comprises a sensor module containing at least one sensor and an analog/digital converter for digitizing the analog measurement signal furnished by the sensor as well as an analyzer module with means for digitally processing the digitized measurement data furnished by the sensor module. The program code and the sensor-specific coefficients for processing the digitized measurement data are stored in a non-volatile digital memory in the sensor module. On power up a control circuit contained in the sensor module prompts transfer of the memorized data and subsequent transfer of the digitized measurement data via a unidirectional serial interface to the analyzer module, as a result of which on installation or replacement of a sensor module all sensor-specific data is directly available at the analyzer module. Furthermore, DC decoupling the sensor module from the analyzer module is made possible by simple means.

32 Claims, 2 Drawing Sheets

MEASURING ASSEMBLY

BACKGROUND OF THE INVENTION

The invention relates to a measuring assembly comprising a sensor module containing at least one sensor for sensing physical measured variables and for each sensor an analog/digital converter for digitizing the analog measurement signal furnished by the sensor as well as a non-volatile digital memory in which sensor-specific configuration data are stored, and an analyzer module connected to the sensor module by a digital interface and means for digitally processing the digitized measurement data furnished by the sensor module, means for outputting the processed measurement data and power supply means.

Measuring assemblies of this kind enable the sensor signals in the sensor module to be digitized as near as possible to the sensor and permit further processing such as compensating and converting the measurement results into a form suitable for outputting in the analyzer module separate from the sensor module, as a result of which the noise immunity and signal stability of the measuring assembly are enhanced. Storing the sensor characteristic data such as sensitivity and temperature coefficient as a function of the object concerned in a non-volatile digital memory directly at the sensor makes it easier for the manufacturer to speed up delivery by stocking prefabricated calibrated sensor and analog modules for a plurality of measurement results and licenced options. In addition, repairs or re-ranging the assembly can be implemented without delay in-situ without repeat factory recalibration.

DESCRIPTION OF THE PRIOR ART

In known measuring assemblies of this kind a bidirectional serial periphery bus controlled by the microcontroller of the analyzer module usually serves as the interface between the sensor module and the analyzer module. The microcontroller addresses via this bus the components of the sensor module, such as the analog/digital converter and the non-volatile digital memory, configurates the sensor module, reads the memorized data and retrieves the measured variables. The program code required for this is stored in the analyzer module, the same applying to the configuration data required. Accordingly, changing the sensor module also necessitates, as a rule, changes in the analyzer module.

Measuring assemblies of the cited kind are usually subject to the requirement that all connecting leads for power supply, measurement signal transfer, communication etc are designed floating relative to the casing. However, to minimize noise being coupled into the sensor and for satisfying specific safety requirements it would be of advantage to directly connect the sensor to the casing. Although these two conflicting requirements could be satisfied by high-potential DC decoupling the sensor module from the analyzer module, the bidirectional serial interfaces needed in known measuring assemblies do not lend themselves to DC decoupling or only by involving a lot of trouble.

SUMMARY OF THE INVENTION

It is thus the object of the invention to define a measuring assembly of the aforementioned kind which permits simple replacement of the sensor module without having to change the analyzer module and zero-potential DC decoupling of the sensor module from the analyzer module by simple means and at little expense.

In accordance with the invention this object is achieved in a measuring assembly comprising a sensor module containing at least one sensor for sensing physical measured variables and for each sensor an analog/digital converter for digitizing the analog measurement signal furnished by the sensor as well as a non-volatile digital memory in which sensor-specific configuration data are stored, and an analyzer module connected to the sensor module by a digital interface and means for digitally processing the digitized measurement data furnished by the sensor module, means for outputting the processed measurement data and power supply means, wherein the digital interface is a unidirectional serial interface configured for transferring digital data from the sensor module to the analyzer module, the non-volatile digital memory in the sensor module contains configuration data for initializing the sensor module as well as the program code and coefficients for processing the digitized measurement data in the analyzer module and the sensor module contains a control circuit which immediately on power up of the sensor module prompts readout of the data stored in the non-volatile digital memory, initializes the sensor module by the configuration data readout and transfer of the memorized data readout via the serial interface to the analyzer module and on completion of transfer of the memorized data prompts transfer of one data block each containing the digitized measurement data via the serial interface to the analyzer module at regular intervals in time without needing to be requested.

In the measuring assembly in accordance with the invention all sensor-specific data including the configuration data and the program code needed for processing the measurement data are stored in the sensor module. Accordingly, it is not necessary that the data processing circuit contained in the analyzer module "sees" the type of sensor involved and its individual correction algorithm, thus making it possible to operate totally differing types of sensors with a single, uniform analyzer module.

Initializing the sensor module is done, without the assistance of the analyzer module, on the basis of the configuration data stored in the sensor module. In the same way the sensor-specific data needed for digitally processing in the analyzer module together with the program code needed for this purpose and in the further course the measurement data to be processed are transferred by the analyzer module from the sensor module to the analyzer module without needing to be requested. Thus each data transfer is exclusively in the direction from the sensor module to the analyzer module, this being the reason why the digital interface between the two modules is a unidirectional serial interface permitting DC decoupling by simple means. In the opposite direction only the power supply of the sensor module from the analyzer module as well as, where necessary, transfer of a clock signal take place; these single-ended connections likewise permitting simple means of DC decoupling.

BRIEF DESCRIPTION OF THE DRAWINGS

Further advantages and features of the invention read from the following description of example embodiments of the invention with reference to the drawing in which.

DESCRIPTION OF THE PREFERRED EMBODIMENT

Figure 1:
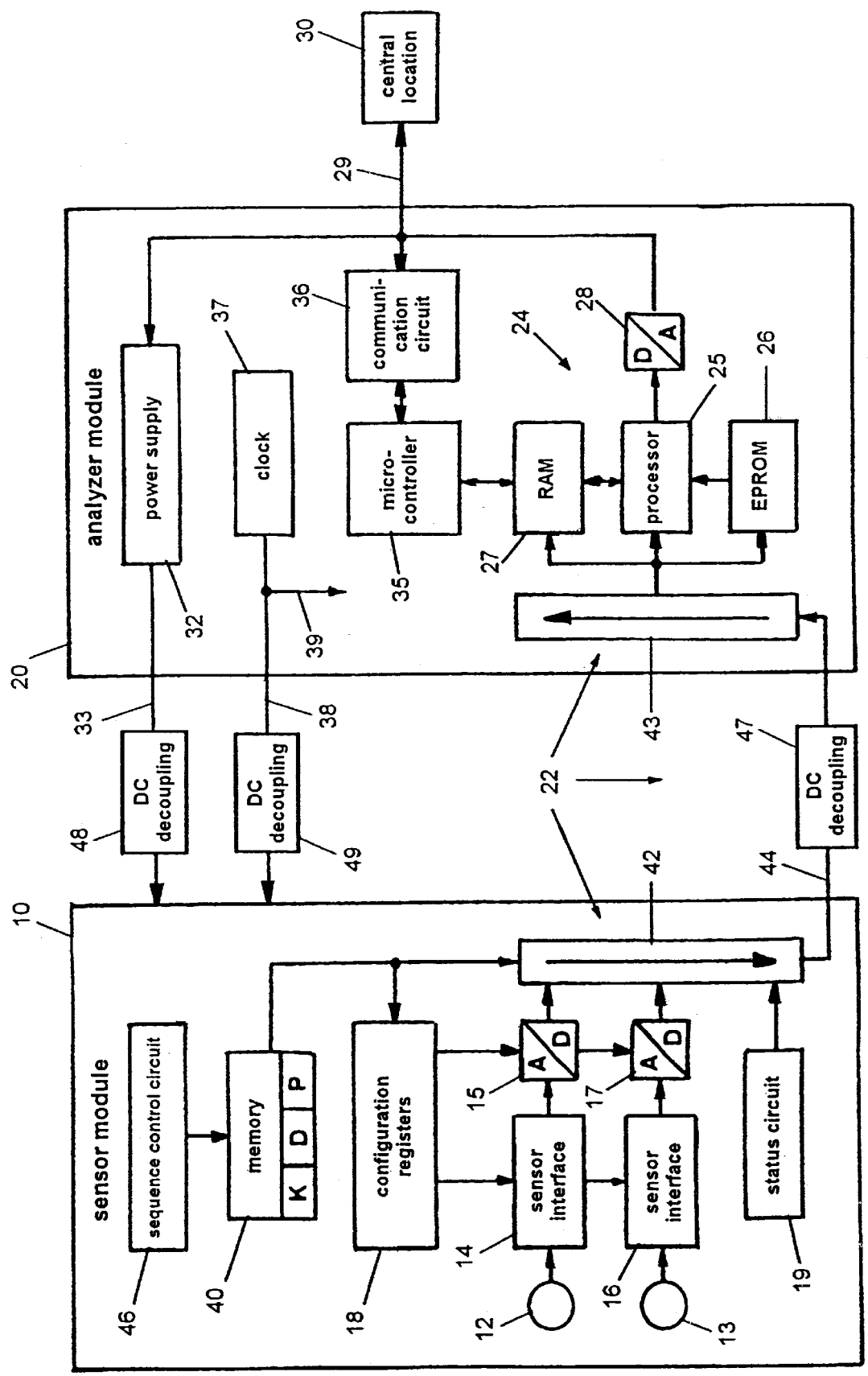
FIG. 1 is a block diagram of a measuring assembly in accordance with the invention and FIG. 2 illustrates a modified embodiment of part of the assembly as shown in FIG. 1.

The measuring assembly as evident from the block diagram in FIG. 1 contains a sensor module 10 serving to sense physical measured variables, it containing for this purpose for each measured variable to be sensed a sensor which furnishes an analog electrical output signal as a function of the value of the sensed measured variable. Illustrated as an example is a pressure transmitter containing a pressure sensor 12 and a temperature sensor 13 since it is usually so that also the temperature of the pressure sensor is measured and, for example, made use of for compensation and/or calibration. The analog output signal of the pressure sensor 12 is applied via a sensor interface circuit 14, serving to adapt the sensor, to an analog/digital converter 15 in which it is digitized. In the same way the analog output signal of the temperature sensor 13 is applied via a sensor interface circuit 16 to the analog/digital converter 17 in which it is digitized. The analog/digital converters 15 and 17 furnish at their outputs digitized measurement data indicating the sensed pressure and temperature respectively. Sensor adaptation by the sensor interface circuits 14, 16 and digitizing the measurement data in the analog/digital converters 15 and 17 occurs as a function of the sensor-specific configuration data held in the configuration registers 18. Furthermore, the sensor module 10 contains a status circuit 19 which outputs a digital status signal indicating each status of the sensor module.

The measuring assembly contains furthermore an analyzer module 20 in which the digitized measurement data furnished by the sensor module 10 is processed. The analyzer module 20 may be located separate from the sensor module and is connected thereto by an interface 22 via which the digitized measurement data and the digital status signal are transferred from the sensor module 10 to the analyzer module 20. The analyzer module contains a data processing means 24 with a processor 25, an EPROM 26 and a RAM 27. Data processing serves to correct the measurement data as a function of the properties of the individual sensors employed. The processed measurement data may be converted, for example, conventionally by a digital/analog converter 28 into an analog measurement signal which is transmitted via a two-wire line 29 to a central location 30 in which the result of the measurement is displayed or made use of otherwise. In accordance with a usual standard the analog measurement signal may be, for example, a current variable between 4 and 20 mA.

The analyzer module 20 contains furthermore a power supply circuit 32 obtaining the energy needed for operation of the measuring assembly via the two-wire line 29 and providing the power supply of all circuits of the analyzer module 20 as well as via a supply line 33 the power supply of the sensor module 10. In addition, the analyzer module 20 may also contain a microcontroller 35 for operating the measuring assembly, this microcontroller being connected to the central location 30 via a communication circuit 36 and is able to modify the data held in the RAM 27. The communication between the central location 30 and the microcontroller 35 may be achieved for example by pulsed communication signals superimposed on the analog measurement signal on the two-wire line 29.

In conclusion the analyzer module contains a clock 37 dictating the working cycle of the various function circuits of the analyzer module 20 and via a clock line 38 also the working cycle of the various function circuits of the sensor module 10. The connections between the clock 37 and the various clocked circuits of the analyzer module 20 are not shown in detail, they instead merely being indicated by the arrow 39.

The sensor module 10 contains a non-volatile digital memory 40 in which on completion of fabrication of the sensor module all sensor-specific data as needed for sensing the measurement data in the sensor module 10 and for processing the measurement data in the analyzer module 20 are stored as a factory standard, this involving the configuration data K required in the configuration registers 18, sensor characteristic data D needed for processing the measurement data in the analyzer module 20 and, more particularly, the program code P with which the measurement data of the individual sensors is to be corrected by data processing in the data processing means 24 of the analyzer module 20.

The sensor characteristic data D and the program code P needed by the analyzer module 20 are likewise transferred via the interface 22 from the sensor module 10 to the analyzer module 20. The interface 22 is a unidirectional serial interface to which a parallel/series converter 42 in the sensor module 10, a series/parallel converter 43 in the analyzer module 20 and a single line 44 connecting the two converters 42 and 43 belong.

A sequence control circuit 46 contained in the sensor module 10 controls the functions of the measuring assembly as described, in the following way:

On commencement of operation of the measuring assembly, as dictated for example by power up of the power supply, the sequence control circuit 46 prompts firstly read-out of the data memorized in the non-volatile digital memory 40 without having to be requested to do so by the analyzer module 20. The configuration data K are entered into the configuration registers 18 whilst the sensor characteristic data D and the program code P are transferred via the serial interface 22 to the analyzer module 20 where the sensor characteristic data D are deposited in the RAM 27 and the program code P in the EPROM 26. Transfer of the measurement data via the serial interface 22 is disabled during these actions. Entering the configuration data K into the configuration registers 18 initializes the sensor module 10.

On completion of transfer of the memorized data the sequence control circuit 46 prompts, again without being requested by the analyzer module 20, transfer of a data block, each containing the digitized measurement data of the sensors 12 and 13 at regular intervals in time via the serial interface 22. In the analyzer module 20 this measurement data is entered into the processor 25 and corrected by the program code stored in the EPROM 26 as a function of the sensor characteristic data stored in the RAM 27. The corrected measurement data is then converted in the digital/analog converter 28 into an analog measurement signal which is transferred via the two-wire line 29 to the central location 30. Each data block can commence with a start bit and end with a stop bit. Processing the measurement data in the analyzer module 20 is activated each time by transfer of a data block.

One advantagous configuration of the measuring assembly results from the fact that data transfer via the serial interface 22 is in one direction only, namely from the sensor module 10 to the analyzer module 20, as a result of which the sensor module 10 can be simply high-potential DC decoupled from the analyzer module 20, on the one hand, and from the circuits connected thereto, on the other. For total DC decoupling each connection between the sensor module 10 and the analyzer module 20 must be DC decoupled. This is why in the measuring assembly as shown in FIG. 1 DC decouplings 47, 48 and 49 are inserted in the line 44 of the unidirectional serial interface 22, in the signal line 33 and in the clock line 38 respectively. The DC decoupling 48 inserted in the signal line 33 may be formed by a DC/DC converter containing a transformer. The DC decouplings 47 and 49 inserted in the signal transfer lines 44 and 38 respectively may be formed by an inductive or capacitive line transformers; since, however, each of these signal transfer lines transfers signals in one direction only, each of the DC decouplings 47 and 49 may be formed by an optocoupler. This DC decoupling makes it possible to directly connect the sensors 12 and 13 in the sensor module 10 to the ground potential of the casing whilst all connecting leads of the analyzer module 20 leading outwards can be designed floating relative to the casing.

If the sensor module 10 is replaced by another sensor module the new sensor module receives all configuration data needed for its initialization as well as all sensor characteristic data required for processing the measurement data in the analyzer module 20 and the corresponding program code in its non-volatile digital memory 40. Accordingly, replacement can be done in-situ without necessitating any changes whatsoever to the analyzer module. In addition all repairs or re-ranging can be done in-situ without a repeat factory calibration.

It will be appreciated, of course, that various modifications of the measuring assembly as described are possible. Instead of converting the corrected measurement data in the digital/analog converter 28 into an analog measurement signal which is transferred via the two-wire line 29 to the central location 30 it may be provided for that the microcontroller 35 converts the corrected measurement data into digital measurement signals which are transferred via the communication circuit 36 and the line 29 to the central location 30. Furthermore, the microcontroller 35, where formed by a corresponding high-performance microcontroller, may also handle the functions of the data processing means 24 formed by the processor 25, EPROM 26 and RAM 27, i.e. storing the sensor characteristic data and the program code to be transferred on power up via the serial interface 22 as well as correction of the digitized measurement data then transferred via the serial interface 22.

Figure 2:
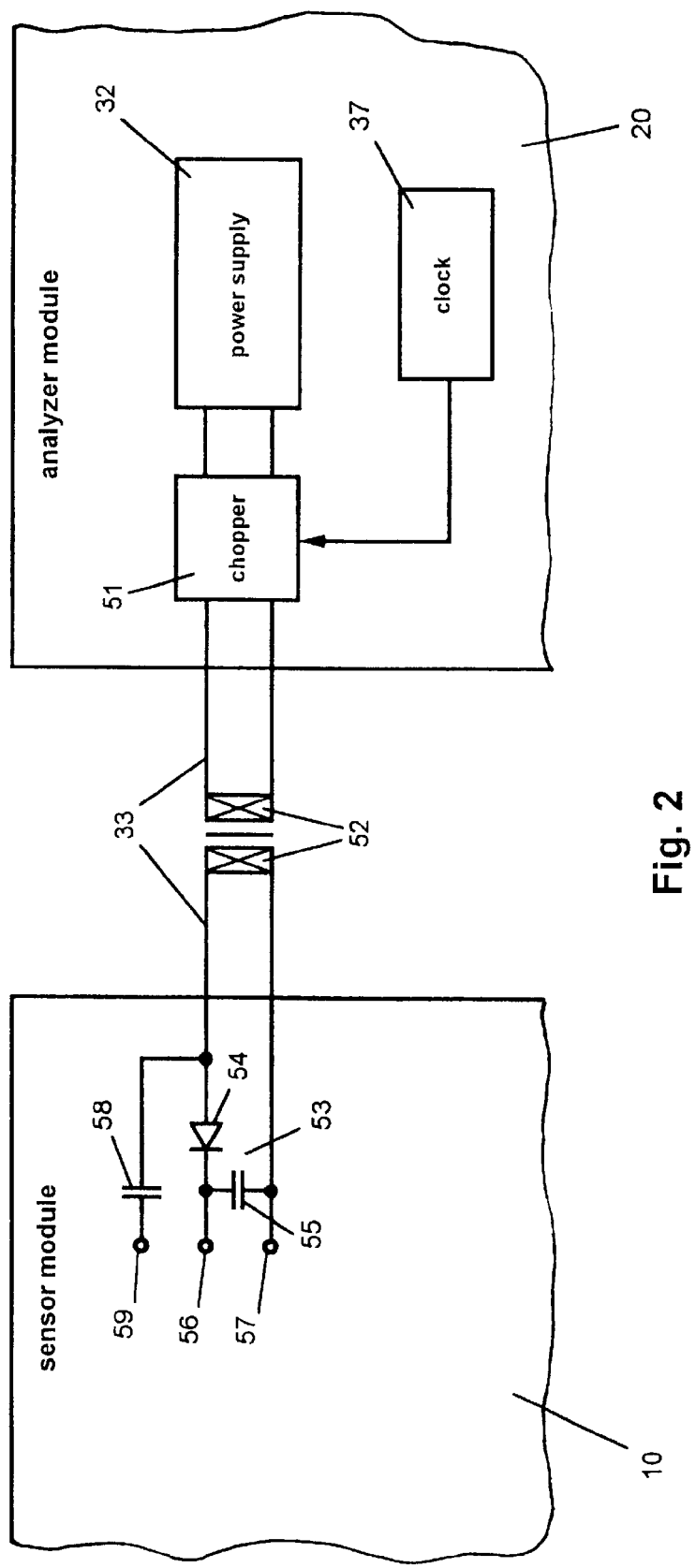

Instead of transferring the timing cycle for the sensor module 10 by a separate clock line 38 it is also possible to derive this timing cycle from the DC decoupling 48 inserted in the supply line 33. Referring now to FIG. 2 there is illustrated an example embodiment in which the DC decoupling 48 is formed by a DC/DC converter. FIG. 2 shows a section of the sensor module 10 and a section of the analyzer module 20 with the power supply circuit 32 and the clock 37. The DC/DC converter contains a chopper 51 which receives the DC furnished by the power supply circuit 32, a transformer 52 connected to the output of the chopper 51 and a rectifier circuit 53 comprising a rectifier 54 and a smoothing capacitor 55 connected to the secondary winding of the transformer 52. The chopper 51 is arranged in the analyzer module 20, the rectifier circuit 53 is arranged in the sensor module 10 and the transformer 52 is inserted for DC decoupling in the supply line 33 connecting the chopper 51 to the rectifier circuit 53. The clock input of the chopper 51 receives the clock signal furnished by the clock 37. The chopper 51 generates from the DC voltage furnished by the power supply circuit 32 a square-wave AC voltage, the frequency of which is determined by the clock 37. This square-wave AC voltage is transferred via the transformer 52 and converted by the rectifier circuit 53 into the supply DC of the sensor module 10 which is available at the output terminals 56 and 57 of the rectifier circuit 53. From the square-wave AC voltage transmitted via the transformer 52 the timing cycle for the sensor module 10 is derived prior to rectification, for example by means of a capacitor 58 connected between the secondary winding of the transformer 52 and the rectifier circuit 53, this capacitor forming from the square-wave AC voltage transmitted by the transformer 52 a clock signal which is available at the terminal 59. The timing cycle of the sensor module 10 is thus dictated by the clock 37.

It is also possible to provide the sensor module 10 with its own clock which furnishes a timing cycle for the sensor module 10 independently of the clock 37 of the analyzer module 20. In this case the unidirectional serial interface 22 needs to be an asynchronous interface, whereas if the timing cycle of the sensor module 10 is dictated by the clock 37 of the analyzer module 20 in one of the ways described then it is irrelevant whether the unidirectional serial interface is a synchronous or asynchronous interface.

What is claimed is:

1. A measuring assembly comprising a sensor module containing at least one sensor for sensing physical measured variables and for each sensor an analog/digital converter for digitizing the analog measurement signal furnished by the sensor as well as a non-volatile digital memory in which sensor-specific configuration data are stored, and an analyzer module connected to the sensor module by a digital interface and comprising means for digitally processing the digitized measurement data furnished by the sensor module, means for outputting the processed measurement data and power supply means, wherein said digital interface is a unidirectional serial interface configured for transferring digital data from said sensor module to said analyzer module, said non-volatile digital memory in said sensor module contains configuration data for initializing said sensor module as well as program code and coefficients for processing said digitized measurement data in said analyzer module and said sensor module contains a control circuit which
immediately on power up of said sensor module prompts readout of said data stored in said non-volatile digital memory, initializes said sensor module by said configuration data readout and transfer of said memorized data readout via said serial interface to said analyzer module and
on completion of transfer of said memorized data prompts transfer of one data block each containing said digitized measurement data via said serial interface to said analyzer module at regular intervals in time without needing to be requested.

2. The measuring assembly as set forth in claim 1, wherein said analyzer module contains a power supply circuit and that said power supply for operating said sensor module is transferred from said power supply circuit via a supply line to said sensor module.

3. The measuring assembly as set forth in claim 2, wherein said analyzer module contains a clock and that said timing cycle of said sensor module is derived from the clock signal furnished by said clock via said supply line.

4. The measuring assembly as set forth in claim 3, wherein said power supply of said sensor module is provided via said power supply of said analyzer module via a DC/DC converter comprising a chopper arranged in said analyzer module, controlled by said clock signal of said clock, a rectifier circuit arranged in said sensor module and a transformer inserted between said chopper and said rectifier circuit for DC decoupling in said supply line, and that in said sensor module said timing cycle is derived from the AC voltage furnished by said transformer to said rectifier circuit.

5. The measuring assembly as set forth in claim 10, wherein said analyzer module contains a data processing means and that processing of said measurement data contained in each data block is initiated in said data processing means by transfer of said data block.

6. The measuring assembly as set forth in claim 3, wherein said analyzer module contains a data processing means and that processing of said measurement data contained in each data block is initiated in said data processing means by transfer of said data block.

7. The measuring assembly as set forth in claim 2, wherein said analyzer module contains a clock, the clock signal of which is transferred via a clock line to said sensor module.

8. The measuring assembly as set forth in claim 2 wherein DC decoupling is inserted in every connection between said sensor module and said analyzer module.

9. The measuring assembly as set forth in claim 2, wherein said sensor module and said analyzer module each contain its own clock for furnishing its timing cycle and that said unidirectional serial interface is an asynchronous interface.

10. The measuring assembly as set forth in claim 2, wherein said analyzer module contains a data processing means and that processing of said measurement data contained in each data block is initiated in said data processing means by transfer of said data block.

11. The measuring assembly as set forth in claim 1, wherein said analyzer module contains a clock, the clock signal of which is transferred via a clock line to said sensor module.

12. The measuring assembly as set forth in claim 11 wherein DC decoupling is inserted in every connection between said sensor module and said analyzer module.

13. The measuring assembly as set forth in claim 11, wherein said analyzer module contains a data processing means and that processing of said measurement data contained in each data block is initiated in said data processing means by transfer of said data block.

14. The measuring assembly as set forth in claim 1 wherein DC decoupling is inserted in every connection between said sensor module and said analyzer module.

15. The measuring assembly as set forth in claim 14, wherein said DC decoupling inserted in a signal line is formed by an inductive or capacitive line transformer.

16. The measuring assembly as set forth in claim 15, wherein said circuits of said sensor module are connected to case potential.

17. The measuring assembly as set forth in claim 15, wherein said analyzer module contains a data processing means and that processing of said measurement data contained in each data block is initiated in said data processing means by transfer of said data block.

18. The measuring assembly as set forth in claim 14, wherein said DC decoupling inserted in a signal line is formed by an optocoupler.

19. The measuring assembly as set forth in claim 18, wherein said circuits of said sensor module are connected to case potential.

20. The measuring assembly as set forth in claim 18, wherein said analyzer module contains a data processing means and that processing of said measurement data contained in each data block is initiated in said data processing means by transfer of said data block.

21. The measuring assembly as set forth in claim 14, wherein said DC decoupling inserted in a supply line is formed by a transformer.

22. The measuring assembly as set forth in claim 21, wherein said circuits of said sensor module are connected to case potential.

23. The measuring assembly as set forth in claim 21, wherein said analyzer module contains a data processing means and that processing of said measurement data contained in each data block is initiated in said data processing means by transfer of said data block.

24. The measuring assembly as set forth in claim 14, wherein said circuits of said sensor module are connected to case potential.

25. The measuring assembly as set forth in claim 24, wherein said analyzer module contains a data processing means and that processing of said measurement data contained in each data block is initiated in said data processing means by transfer of said data block.

26. The measuring assembly as set forth in claim 14, wherein said analyzer module contains a data processing means and that processing of said measurement data contained in each data block is initiated in said data processing means by transfer of said data block.

27. The measuring assembly as set forth in claim 1, wherein said sensor module and said analyzer module each contain its own clock for furnishing its timing cycle and that said unidirectional serial interface is an asynchronous interface.

28. The measuring assembly as set forth in claim 27, wherein said analyzer module contains a data processing means and that processing of said measurement data contained in each data block is initiated in said data processing means by transfer of said data block.

29. The measuring assembly as set forth in claim 1, wherein said analyzer module contains a data processing means and that processing of said measurement data contained in each data block is initiated in said data processing means by transfer of said data block.

30. The measuring assembly as set forth in claim 29, wherein each data block begins with a start bit and ends with a stop bit.

31. The measuring assembly as set forth in claim 30, wherein said data processing assembly contains a processor, an EPROM and a RAM and that said control circuit contained in said sensor module prompts transfer of said program code contained in said non-volatile digital memory into said EPROM and the transfer of said sensor characteristic data contained in said non-volatile digital memory into said RAM.

32. The measuring assembly as set forth in claim 29, wherein said data processing assembly contains a processor, an EPROM and a RAM and that said control circuit contained in said sensor module prompts transfer of said program code contained in said non-volatile digital memory into said EPROM and the transfer of said sensor characteristic data contained in said non-volatile digital memory into said ram.

* * * * *

UNITED STATES PATENT AND TRADEMARK OFFICE
CERTIFICATE OF CORRECTION

PATENT NO. : 6,427,129 B1
DATED : July 30, 2002
INVENTOR(S) : Robert Lalla

It is certified that error appears in the above-identified patent and that said Letters Patent is hereby corrected as shown below:

<u>Title page,</u>
Item [56], References Cited, please add the following cited to the "OTHER PUBLICATIONS" section of the bibliography page:
-- Brignel et al., Sensors for Microprocessor-Based Applications, J. Phys. E: Sci. Instrum., Vol. 16, pp. 952-958 (1983) --

Signed and Sealed this

Twelfth Day of November, 2002

Attest:

Attesting Officer

JAMES E. ROGAN
*Director of the United States Patent and Trademark Office*